US012699657B2

(12) United States Patent
Kumar et al.

(10) Patent No.: US 12,699,657 B2
(45) Date of Patent: Aug. 4, 2026

(54) MANAGEMENT AND RECOVERY OF FLASHLESS DATA PROCESSING SYSTEM PERIPHERAL DEVICES

(71) Applicant: Dell Products L.P., Round Rock, TX (US)

(72) Inventors: Ajeesh Kumar, Bangalore (IN); Pavan Kumar Gavvala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,449

(22) Filed: Jul. 26, 2024

(65) Prior Publication Data

US 2026/0030179 A1     Jan. 29, 2026

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
CPC ....................................................... G06F 1/163
See application file for complete search history.

(56) References Cited

U.S. PATENT DOCUMENTS

| | | | |
|---|---|---|---|
| 5,339,404 | A | 8/1994 | Vandling, III |
| 5,740,429 | A | 4/1998 | Wang |
| 7,024,567 | B2 | 4/2006 | Kim |
| 7,418,545 | B2 | 8/2008 | Marushak |

| | | | |
|---|---|---|---|
| 7,865,775 | B2 * | 1/2011 | Yao ...................... G06F 11/1417 |
| | | | 714/36 |
| 7,974,286 | B2 | 7/2011 | Keohane et al. |
| 8,817,000 | B1 | 8/2014 | Sauvage |
| 9,804,646 | B2 | 10/2017 | Jaussi |
| 10,416,988 | B1 * | 9/2019 | Kulchytskyy ........... G06F 13/36 |
| 2002/0095611 | A1 | 7/2002 | Jochiong |
| 2003/0182577 | A1 | 9/2003 | Mocek |
| 2008/0059720 | A1 | 3/2008 | Rothman |
| 2008/0162952 | A1 | 7/2008 | Landers |
| 2009/0132838 | A1 | 5/2009 | Cherian |

(Continued)

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HROT.pdf> accessed on Jul. 23, 2024 (17 Pages).

(Continued)

*Primary Examiner* — Henry Tsai
*Assistant Examiner* — Juanito C Borromeo
(74) *Attorney, Agent, or Firm* — WOMBLE BOND DICKINSON (US) LLP

(57) ABSTRACT

Methods and systems for managing a data processing system are disclosed. In particular, one or more flashless peripheral devices may be connected to the data processing system. These flashless peripheral devices are unable to provide services they were originally designed to provide, and may not even be detectable by the data processing system. A management controller of the data processing system may use various resources of the data processing system to identify the existence of these flashless peripheral devices. Once identified, the flashless peripheral devices may be restored, by the management controller, to be able to provide the services that these peripheral devices were originally designed to provide.

20 Claims, 7 Drawing Sheets

(56) References Cited

U.S. PATENT DOCUMENTS

| | | | |
|---|---|---|---|
| 2010/0007473 A1 | 1/2010 | Fadell | |
| 2011/0035526 A1 | 2/2011 | Slaight | |
| 2011/0119686 A1 | 5/2011 | Chen | |
| 2014/0195684 A1 | 7/2014 | Taaghol | |
| 2014/0258526 A1 | 9/2014 | Le Sant | |
| 2015/0287273 A1 | 10/2015 | Panzarella | |
| 2015/0304343 A1 | 10/2015 | Cabrera | |
| 2015/0309559 A1 | 10/2015 | Jacobson | |
| 2018/0011524 A1 | 1/2018 | Stumpf | |
| 2018/0062395 A1 | 3/2018 | Aldehayyat | |
| 2020/0044868 A1* | 2/2020 | Vakulenko | G06F 21/305 |
| 2020/0097379 A1 | 3/2020 | Truong | |
| 2020/0218527 A1 | 7/2020 | Ganesan | |
| 2020/0249736 A1 | 8/2020 | Walker | |
| 2020/0257517 A1 | 8/2020 | Seater | |
| 2021/0042062 A1 | 2/2021 | Betusno | |
| 2023/0008238 A1 | 1/2023 | Mugunda | |
| 2023/0016507 A1 | 1/2023 | Kodama | |
| 2023/0205248 A1 | 6/2023 | Srivastav | |
| 2023/0315485 A1 | 10/2023 | Paulraj | |
| 2023/0376575 A1 | 11/2023 | Anzai | |
| 2024/0054039 A1 | 2/2024 | Srinivasan | |
| 2024/0393858 A1 | 11/2024 | Dai | |

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post- processing." arXiv preprint arXiv:2111.14956. IEEE. (2021) (13 Pages).

* cited by examiner

Management Controller <u>152</u>

Peripheral
Device Agent
<u>190</u>

FIG. 1D

MANAGEMENT AND RECOVERY OF FLASHLESS DATA PROCESSING SYSTEM PERIPHERAL DEVICES

FIELD

Embodiments disclosed herein relate generally to data processing system management. More particularly, embodiments disclosed herein relate to systems and methods to manage and recover one or more flashless peripheral devices that are connected to a data processing system.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 1D shows a block diagram illustrating a management controller in accordance with one or more embodiments.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
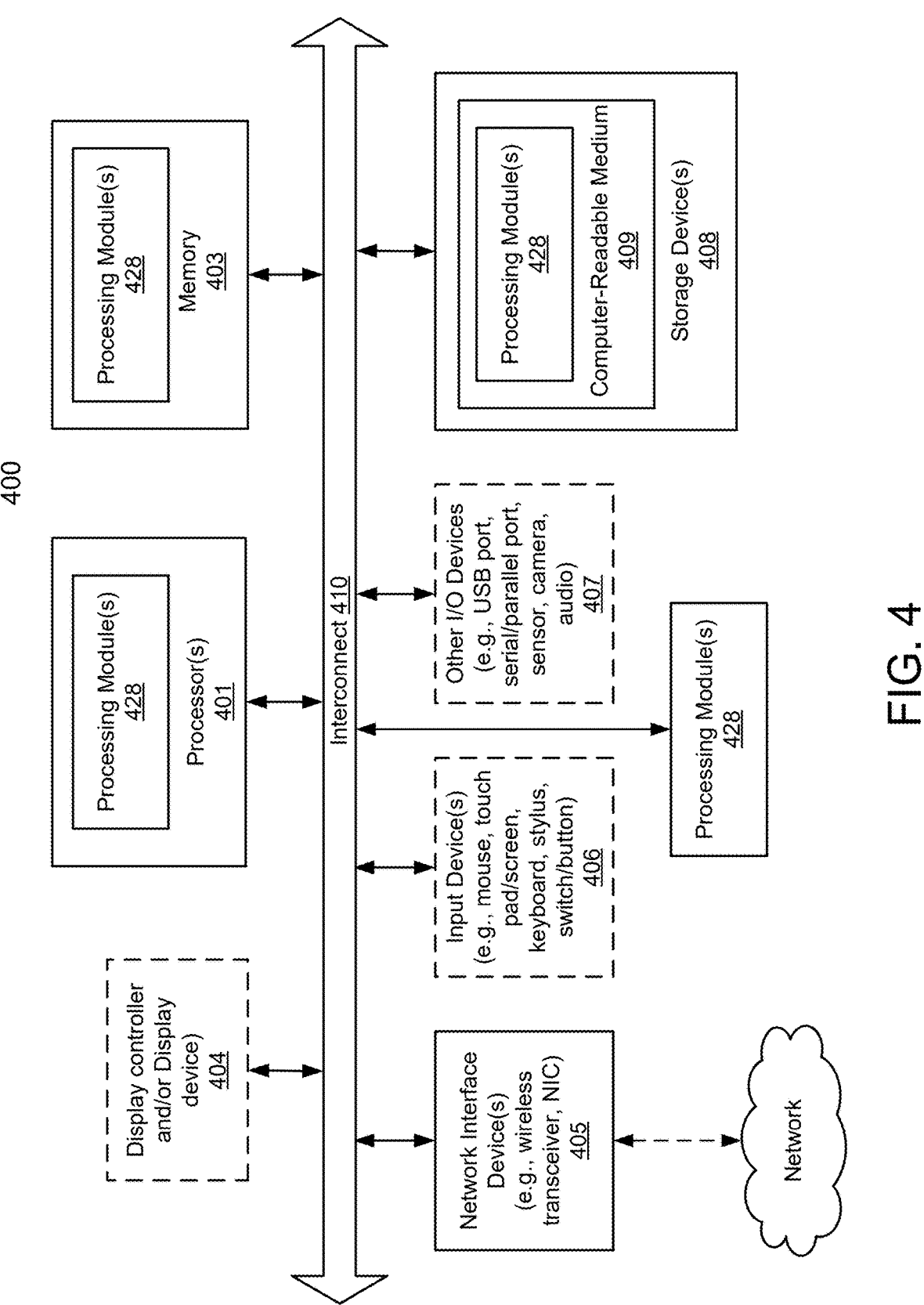
FIG. 4 shows a block diagram illustrating a computing device in accordance with one or more embodiments.

In general, embodiments disclosed herein relate to methods and systems for managing one or more peripheral devices connected to (e.g., installed within or externally connected to) a data processing system (such as computing devices, as described below in reference to FIG. 4). Peripheral devices may include any type of add-on and/or expansion components (namely, hardware components) such as channel cards (e.g., a fiber channel card, or the like), network interface cards (NICs), graphical processing units (GPU), data processing units (DPUs), digital signal processors (DSPs), or the like.

In one example, a peripheral device may be a radio access network (RAN) DPU. Such RAN DPUs may be cloud-based RAN devices that are crucial hardware components for enhancing telecom networking capabilities of a data processing system (e.g., a data processing system configured as a server or the like). Such RAN DPUs may be used in Cloud-RAN architectures that advantageously centralize radio access networks using cloud computing technology.

However, these peripheral devices may encounter situations while in use by (e.g., while being connected to) the data processing system. For example, a peripheral device connected to the data processing system may not have any firmware (namely, peripheral device firmware) loaded onto the device itself. Additionally, other situations that may arise include: one or more host drivers of the peripheral device (e.g., drivers installed by the host operating system (OS) of the data processing system to use the peripheral device) may have malfunctioned; one or more host drivers of the peripheral device may be corrupted (e.g., have corrupted peripheral device firmware files, or the like); one or more host drivers of the peripheral device having peripheral device firmware with the incorrect configuration; compromised peripheral device firmware having untrusted authentication mechanisms (e.g., authentication certificates, or the like); hardware compatibility issues between the data processing system and the peripheral device; lack of updates to the one or more host drivers; or the like.

All of these situations may result in the peripheral device becoming a flashless peripheral device where the peripheral device is physically connected to the data processing system but cannot be found (e.g., seen) and managed by the data processing system (namely, managed by other components making up the data processing system such as a management controller (e.g., a baseboard management controller (BMC)) of the data processing system or the like). Said another way, once a peripheral device becomes a flashless peripheral device, they peripheral device essentially become invisible to these components making up the data processing system.

Such flashless peripheral devices having any of the above issues may also not be used for what they were originally intended to do (e.g., these flashless peripheral devices cannot be used for important tasks and services that they were originally designed to perform). As a result, when a peripheral device becomes a flashless peripheral device, critical operations and services (e.g., computer-implemented services) of the data processing system (and other data processing systems connected to the one data processing system with the flashless peripheral device) would detrimentally become disrupted, which directly affects the functionalities (e.g., computer functionalities) of these data processing systems in providing computer-implemented services requested by users of these systems.

To put it simply, flashless peripheral devices cause a lot of trouble in deployments (e.g., data centers or the like) containing one or more data processing systems. In particular, flashless peripheral devices are difficult to manage because they cannot be seen (e.g., found) by the data processing systems. Additionally, without firmware, the flashless peripheral devices cannot be used for services to be provided by the data processing systems. Essentially, having a flashless peripheral device is like having tools that cannot be used for the functions they were designed to provide.

To resolve the above issues regarding flashless peripheral devices, such flashless peripheral devices are first identified using new processes and methods associated with embodiments disclosed herein. The flashless peripheral devices may be identified by a management controller (e.g., a BMC in the form of a microcontroller or the like) installed within a data processing system to which the flashless peripheral device is connected. The management controller may be installed within the data processing system to manage the flashless and non-flashless peripheral devices for the data processing system.

The processes of embodiments disclosed herein utilized by the management controller to identify (e.g., find) these flashless peripheral devices are described in more detail below in reference to FIGS. 2 and 3. Additional details regarding the management controller, the peripheral devices, and the data processing system are described below in reference to FIGS. 1B-1D.

Once the flashless peripheral devices are identified by the management controller, the management controller may perform additional processes in accordance with one or more embodiments disclosed herein to return these flashless peripheral devices into a non-flashless state (e.g., a normal operating state as intended by a provider and/or manufacturer of the peripheral device). These additional processes are also described in more detail below in reference to FIGS. 2 and 3.

As a result, embodiments disclosed herein may provide, among others, an improvement (e.g., a technical improvement) to the above-discussed situations where peripheral devices connected to data processing systems become flashless peripheral devices. In particular, a new and improved mechanism, by way of processes performed by the management controller is provided for the data processing system to identify previously unidentifiable flashless peripheral devices (more specifically, previously unidentifiable issues of the data processing system as a result of not being able to identify when peripheral devices become flashless peripheral devices).

Because these flashless peripheral devices are now identifiable, they can now advantageously be returned to the non-flashless state to avoid and minimize disruptions to the functions of the data processing system. Thus, such improvements also directly translate to improvements to the functionalities (e.g., computer functionalities) of the data processing systems for providing services requested by users with minimal to no disruptions as a result of peripheral devices becoming flashless.

Additionally, if a flashless peripheral device cannot immediately be restored to a non-flashless state, the management controller may cause the flashless card to transition into a low power mode. Thus, even though this flashless peripheral device is still connected to the data processing system, it would cause minimal disruptions to functions (e.g., operations, processes, and/or services) of the data processing system that require more (e.g., a higher amount of) system power to perform. This further improves the functionalities of the data processing system by providing an improved mechanism for efficiently managing power distribution and usage of the data processing system (namely, of the components making up the data processing system).

In an embodiment, a method for managing a data processing system is provided. The method may include: making a first determination, by a management controller of the data processing system, that a peripheral device connected to the data processing system is in a flashless state; and instantiate, by the management controller and in response to the first determination, one or more recovery actions to recover the peripheral device from the flashless state.

The management controller is a microcontroller installed within the data processing system that operates independently of a central processing unit (CPU) of the data processing system, the peripheral device is a data processing unit (DPU), and the management controller manages operations of the DPU.

Making the first determination may include: identifying one or more pieces of information indicating that the peripheral device is physically connected to the data processing system; making a second determination, that the management controller is unable to discover the peripheral device despite the peripheral device being physically connected to the data processing system; and tagging the peripheral device as being in the flashless state based on the second determination.

The one or more pieces of information indicating that the peripheral device is physically connected to the data processing system may include: a field replacement unit (FRU) of the peripheral device, communication interface information comprising a physical interface of the data processing system to which the peripheral device is connected, and the data processing system comprising one or more drivers associated with the peripheral device.

The management controller uses an inter-integrated circuit (i2c) discovery mechanism to discover the peripheral device during and after a startup of the data processing system, and the communication interface information is identified from a basic input/output system (BIOS) inventory of the data processing system during the startup of the data processing system.

The one or more recovery actions may include: waiting for a host of the data processing system to be booted up, the host being an operating system (OS) of the data processing system; once the host is booted up, making a second determination that the host comprises a driver issue with regard to the peripheral device in the flashless state; and generating, in response to the second determination, a notification to a user of the data processing system indicating the driver issue.

The driver issue comprises the host missing a driver for the peripheral device in the flashless state or the host comprising an incorrect one for the driver of the peripheral device in the flashless state.

Generating the notification may further include: retrieving driver information and device information of the peripheral device in the flashless state using field replacement unit (FRU) original equipment manufacturer (OEM) data from the peripheral device in the flashless state; and generating, as part of the notification: a link, using the driver information, for retrieving a driver required for the peripheral device in the flashless state to recover from the flashless state, and life cycle logs comprising the device information.

The one or more recovery actions may include: causing the peripheral device in the flashless state to enter a low power mode, the low power mode being automatically stopped by the peripheral device in the flashless state once the flashless state is resolved.

The one or more recovery actions may further include: after causing the peripheral device in the flashless state to enter the low power mode, updating a peripheral device list hosted by the management controller to indicate that the peripheral device has a degraded health status.

A non-transitory media may include instructions that when executed by a processor cause the computer-implemented method to be performed.

A management controller of a data processing system may include the non-transitory media and a processor, and may perform the computer-implemented method when the processor executes the instructions in the non-transitory media.

Figure 1A:
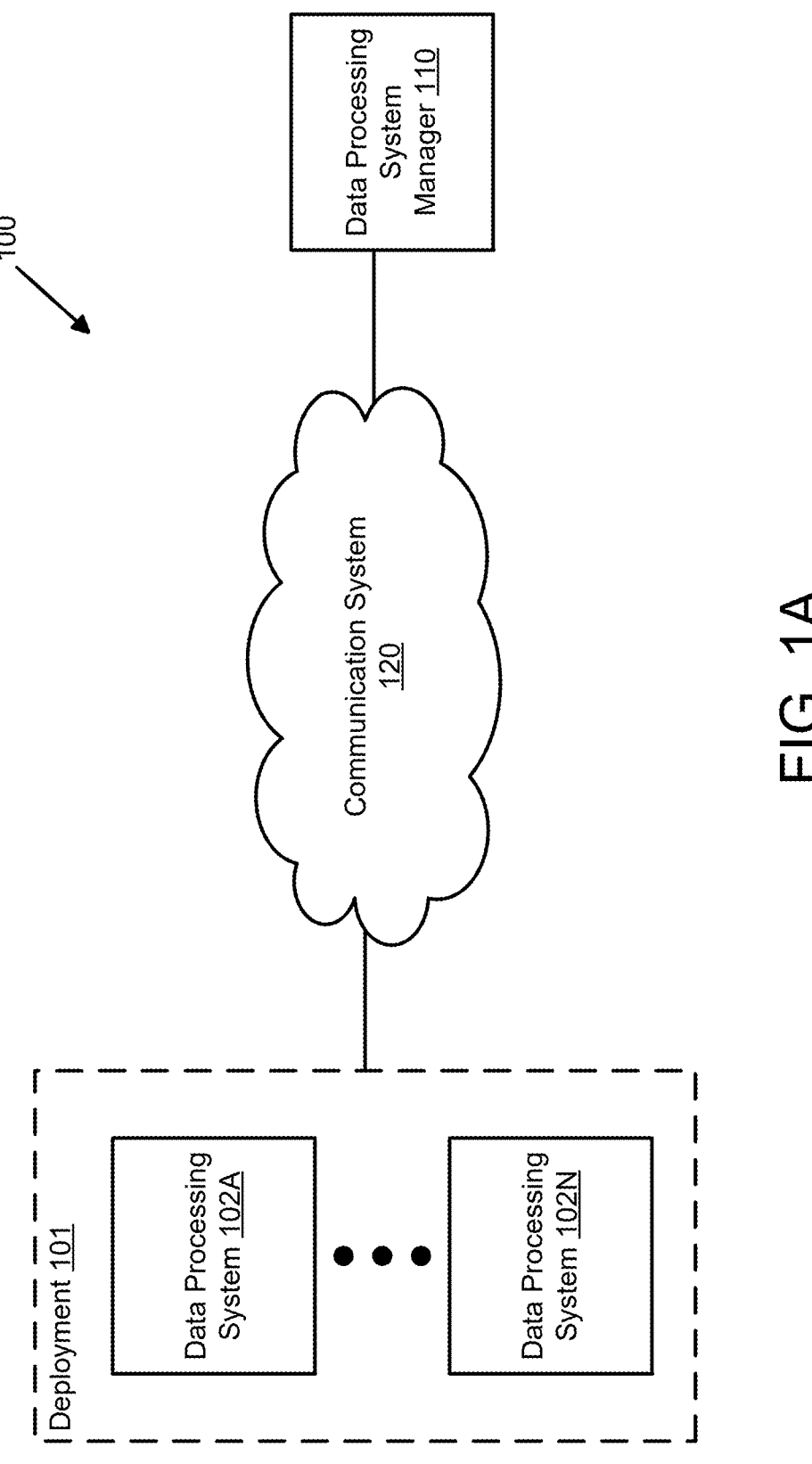
FIG. 1A shows a block diagram illustrating a system in accordance with one or more embodiments.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 102A-102N. Data processing systems 102A-102N may provide the computer implemented services to users of data processing systems 102A-102N and/or to other devices (not shown). Different data processing systems 102A-102N may provide similar and/or different computer implemented services. These data processing systems 102A-102N may be organized in one or more deployments 101 (e.g., server farms, remote storage environments, Cloud-RAN deployments, or the like) to collectively provide the computer implemented services.

To provide the computer implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (discussed in more detail below in FIG. 1B) may provide the computer implemented services via their operation.

The software components may be implemented using various types of services. For example, each data processing system of the data processing systems 102A-102N may host various services that provide the computer implemented service (e.g., application services) and/or that manage the operation of these services (e.g., management services). The aggregate (e.g., combination) of the management and application services may be a complete service that provide desired functionalities.

To manage the data processing systems 102A-102N, the system of FIG. 1A may include data processing system manager 110. Data processing system manager 110 may include various hardware components (e.g., processors, memory modules, storage devices, peripheral devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 102A-102N to communicate with and manage (namely, the components installed within) the data processing systems 102A-102N.

In embodiments, the data processing system manager 110 may also communicate directly with a management controller (discussed in more detail below in FIGS. 1B and 1D) installed within any of the data processing systems 102A-102N. Such communications may be available through one or more application-based services (e.g., application programming interface (API) based services such as Dell®'s Redfish API or the like) providing wireless communication capabilities (e.g., through web servers and/or services, or the like). The data processing system manager 110 may also be provided with a BMC graphical user interface (GUI) for receiving inputs (e.g., commands, files, and other type of data) from a user to be communicated to the management controller. Other types of communication interfaces, protocols, and/or channels (including command line interfaces (CLI) or the like) may also be used to facilitate communication between the management controller and the data processing system manager 110 without departing from the scope of embodiments disclosed within.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Figure 1B:
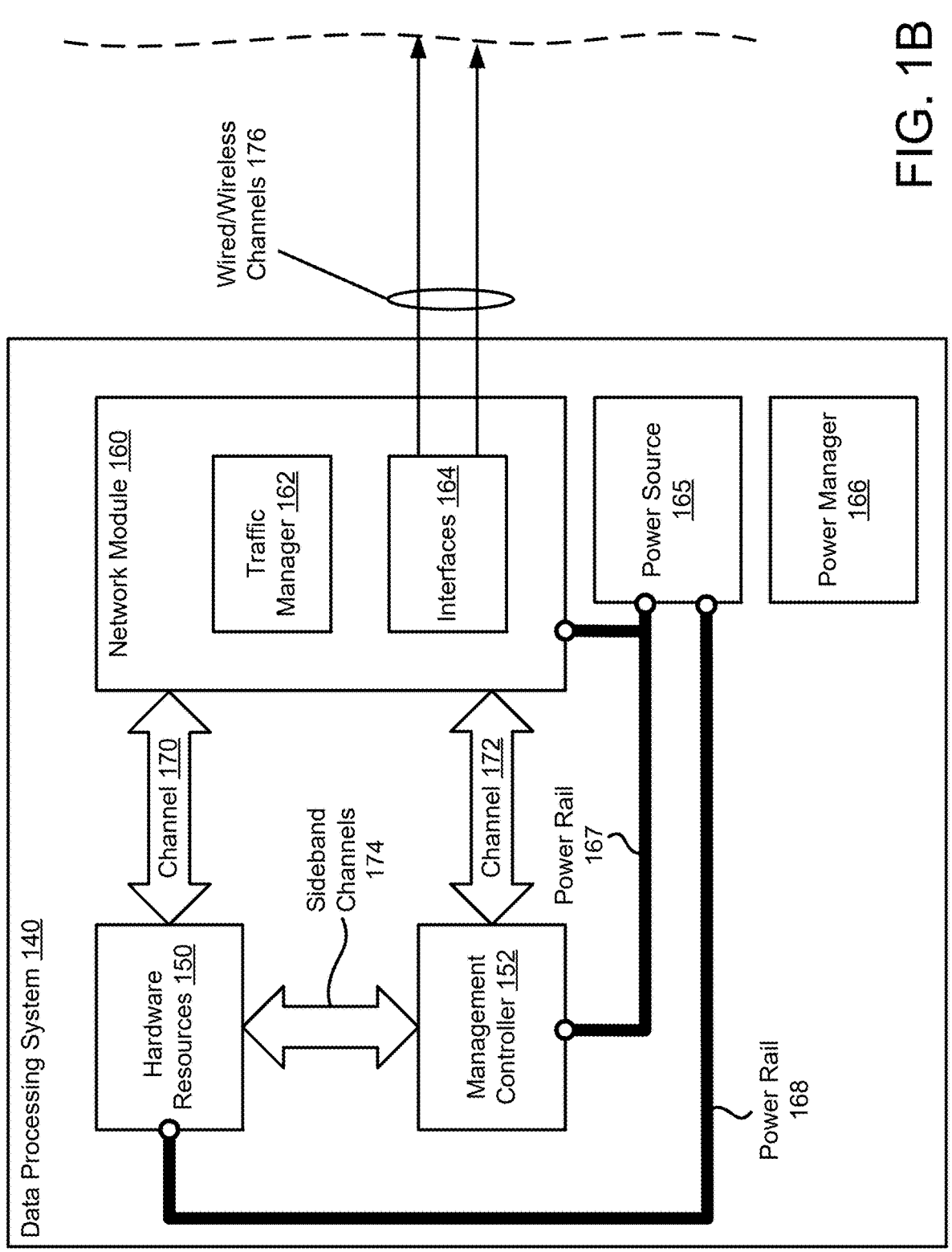
FIGS. 1B-1C show block diagrams illustrating a data processing system in accordance with one or more embodiments.

Turning to FIG. 1B, a diagram illustrating data processing system 140 in accordance with an embodiment is shown. Data processing system 140 may be similar to any of the data processing systems (e.g., any one of data processing systems 102A-102N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components. These hardware resources 150 (in addition to network module 160, management controller 152, power source 165, power manager 166, and the other components shown in FIG. 1B) may be the default hardware components that are included in the data processing system 140 by a manufacturer of the data processing system 140. However, it could be appreciated that the default hardware components may include more (or less) of what is shown in FIG. 1B.

The processor (e.g., a central processing unit (CPU) chip installed on a motherboard, or the like) may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). For example, management controller 152 may be a baseboard management controller (BMC), or the like.

Management controller 152 may provide various management functionalities for data processing system 140. For example, management controller 152 may monitor various ongoing processes performed by the in-band component, may manage power distribution, thermal management, and/ or other functions of data processing system 140. To conduct such monitoring and provide such functions, the management controller 152 may include its own processor (e.g., a second processor separate and operating independently from the main processer of the data processing system).

Additionally, management controller 152 may be operably connected to various components via sideband channels 174 (in FIG. 1B, a limited number of sideband channels are included for illustrative purposes, it will be appreciated that management controller 152 may communication with other components (including peripheral devices installed within the data processing system 140) via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Said another way, as long as the data processing system is connected to a power source (e.g., a batter, a wall outlet, a generator, or the like), management controller 152 may still be powered on and operational while the data processing system itself is in a powered off (e.g., shut down/shut off) state. More specifically, turning off the data processing system 140 (e.g., via a shutdown command) does not also turn off the management controller 152.

To implement the separate power domains, data processing system 140 may include a power source (e.g., 165) that separately supplies power to power rails (e.g., 167, 168) that power the respective power domains. Power from the power source (e.g., one or more power supplies, batteries, or other types of PSUs etc.) may be selectively provided to the separate power rails to selectively power the different power domains. A power manager (e.g., 166) may manage power from power source 165 that is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

In addition to the components (e.g., hardware resources 150, network module 160, management controller 152, power source 165, power manager 166, power rails 167-168, components making up channels 170-172 and sideband channels 174, etc.) additional hardware components (e.g., peripheral devices) (not shown in FIG. 1B) may be installed within (or externally to) the data processing system 140.

In embodiments, these peripheral devices may include channel cards (e.g., a fiber channel card, or the like), network interface cards (NICs), graphical processing units (GPU), data processing units (DPUs), radio access network DPUs (RAN-DPUs), digital signal processors (DSPs), or the like and may communicate with the existing components of the data processing system 140 via various interfaces (e.g., one or more Peripheral Component Interconnect Express (PCIe) buses, universal serial buses (USB), or the like).

These peripheral devices may also draw power from the power source 165 in order to provide their functions (e.g., may be powered entirely, or in part, by power supplied from the power source 165 of the data processing system 140). To perform their functionalities, these peripheral devices may also use the limited computing resources of any of the main processor of the data processing system 140 and/or the processor of management controller 152.

Figure 1C:
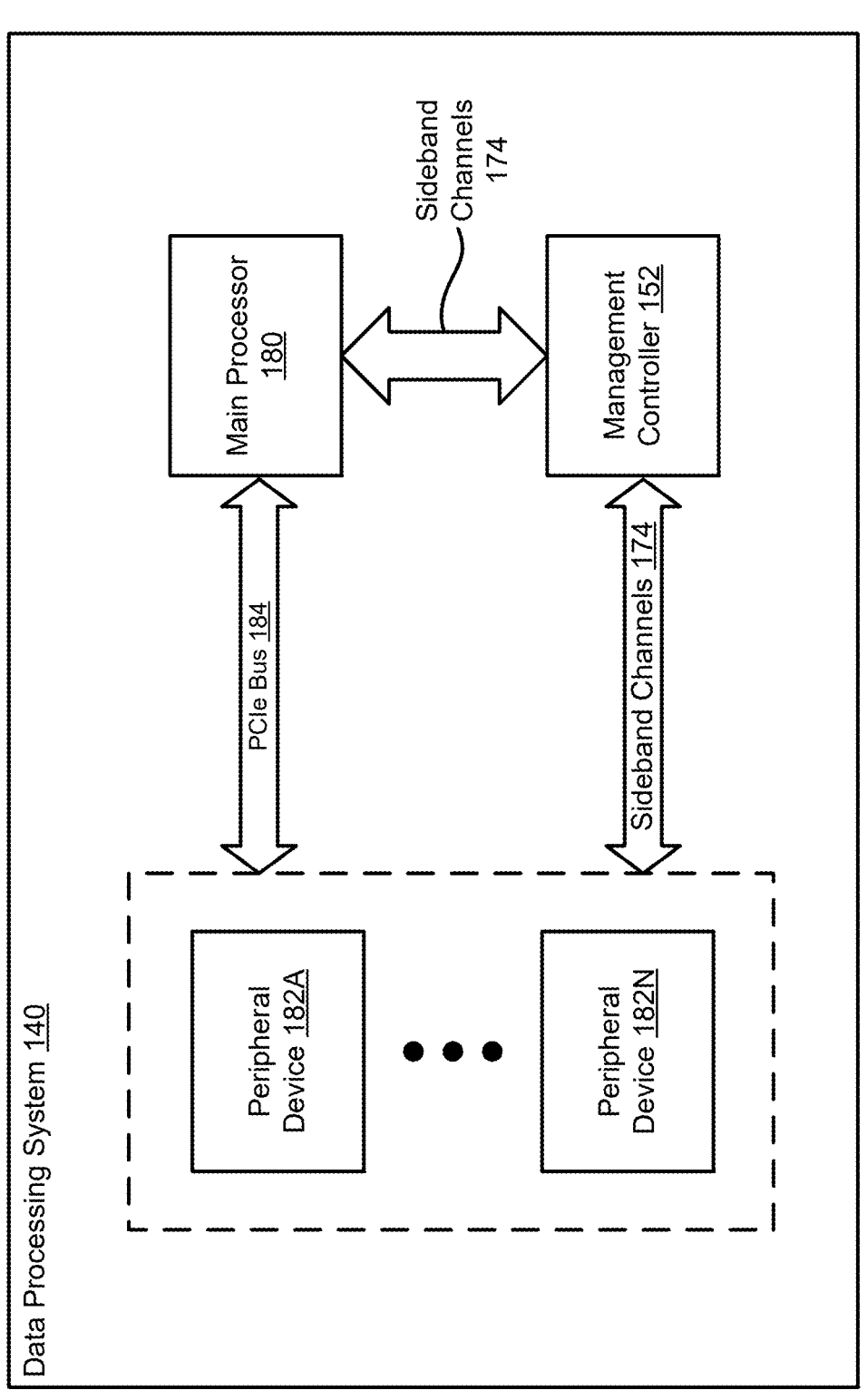

Turning to FIG. 1C, a diagram illustrating an example architecture between the main processor, management controller 152, and peripheral devices of the data processing system 140 is shown. As shown in FIG. 1C, the same data processing system 140 is now shown to include (for exemplary purposes only) just the main processor (e.g., in the form of main processor 180 that includes the basic input/output system (BIOS) (namely, a startup manager) of the data processing system 140), management controller 152, and one or more peripheral devices 182A-182N.

Each of the peripheral devices 182A-182N may be an add-on and/or expansion component (namely, hardware component) such as channel cards (e.g., a fiber channel card, or the like), network interface cards (NICs), graphical processing units (GPU), data processing units (DPUs) (e.g., RAN-DPUs, or the like), digital signal processors (DSPs), or the like. Each of the peripheral devices 182A-182N may include its own processor (namely, a third processor separate from the main processor(s) of the data processing system 140 and the (second) processor(s) of the management controller 152) and its own memory (separate from that of the data processing system's 140 and that of the management controller's 152) storing the peripheral devices' firmware or the like.

As shown in FIG. 1C and discussed above in reference to FIG. 1B, the management controller 152 communicates (e.g., exchanges data) with the main processor 180 via sideband channels 174. The main processor 180 in turn is connected to and communicates (e.g., exchanges data) with the peripheral devices 182A-182N using physical communication bus(es) such as one or more PCIe Buses 184. Other types of physical communication bus(es) besides PCIe Bus 184 (or even virtual connections) may be used depending on the default communication interface(s) and/or connection interface(s) of the peripheral devices 182A-182N without departing from the scope of embodiments disclosed herein.

As further shown in FIG. 1C, the management controller 152 may be connected to and communicate (e.g., exchanges data) with the peripheral devices 182A-182N via sideband channels 174 that are different from the PCIe Bus 184 (and/or the other communication bus(es) connecting the main processor 180 to the peripheral devices 182A-182N). Such sideband channels 174 may be configured using physical and/or virtual paths (e.g., connections) between the management controller 152 and the peripheral devices 182A-182N. For example, such sideband channels 174 may be composed of PCIe buses (or other appropriate communication bus(es)) separate from the ones that connect the startup manager to the peripheral devices 182A-182N. Such sideband channels 174 may also be implemented using inter-integrated circuit (i2c) based communication channels, interfaces, and/or protocols. Even further, such sideband channels 174 may also be implemented using a PCIe vendor defined messaging (VDM) channel. Data (e.g., data packets, instructions, commands, or the like) sent to the peripheral devices 182A-182N over the i2c based communication channels and/or the PCIe VDM channels may be configured and communicated using a management component transport protocol (MCTP).

Other types of data transport protocols and communication interfaces, channels, and/or protocols not described above may also be used for establishing communication between the management controller 152 and the peripheral devices 182A-182N (e.g., via the sideband channels 174) without departing from the scope of embodiments disclosed herein.

Furthermore, in summary, the management controller 152 is configured to communicate with the peripheral devices 182A-182N using a communication channel different from a communication channel used by the main processor 180 to communicate with the peripheral devices 182A-182N. For example, assume that there is only a single peripheral device 182A within the data processing system 140. Further assume that this single peripheral device 182A is connected to the main processor 180 via a PCIe bus (i.e., a first PCIe bus). Even further assume that the management controller 152 is also connected to the single peripheral device via a PCIe bus (i.e., a second PCI bus). In this example, the first PCIe bus would be a completely separate and distinct component (e.g., hardware component) from the second PCIe bus. Said another way, in this example, there would be two separate PCIe buses (e.g., two communication interfaces) that each respectively (and separately) connects the main processor 180 and the management controller 152 to the single peripheral device 182A. More specifically, albeit the same type(s) of communication medium(s) being used, the main processor 180 and the management controller 152 do not share the same communication medium(s) (e.g., the communication interface(s)) themselves and communication path(s) to communicate with the peripheral devices 182A-182N.

As a result, the management controller 152 may advantageously obtain (e.g., retrieve, receive, or the like) data from and issue commands (i.e., instructions) to the peripheral devices 182A-182N without ever having to go through (e.g., utilize) the main processor 180 of the data processing system 140.

Figure 1D:
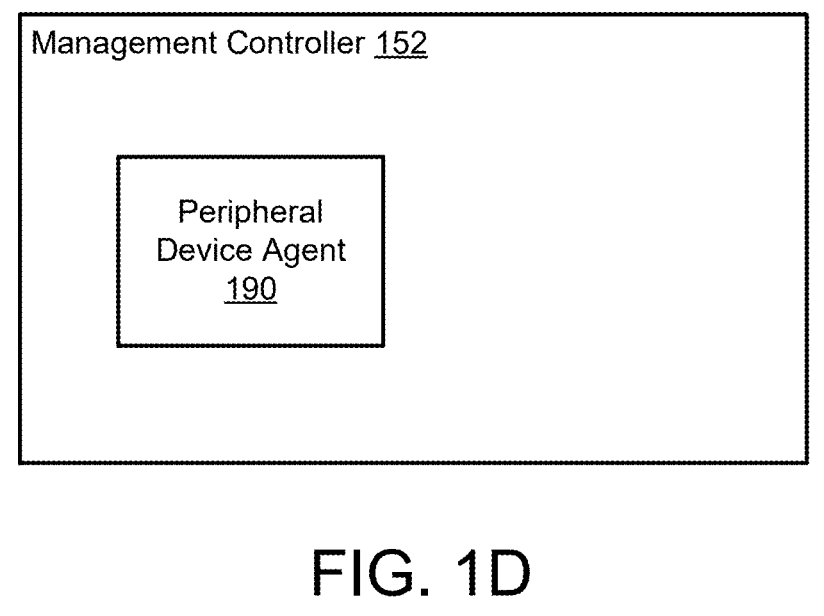

Turning now to FIG. 1D, a management controller 152 of data processing system 140 in accordance with an embodiment is shown. As shown in FIG. 1D, the management controller 152 may include a peripheral device agent 190.

In embodiments, the peripheral device agent 190 of the management controller may be implemented using hardware, software, or a combination of both. The peripheral device agent 190 may be configured to manage the one or more peripheral devices 182A-182N of the data processing system 140 (e.g., through the performance of any and all of the operations discussed below in reference below to FIGS. 2-3).

Figure 2:
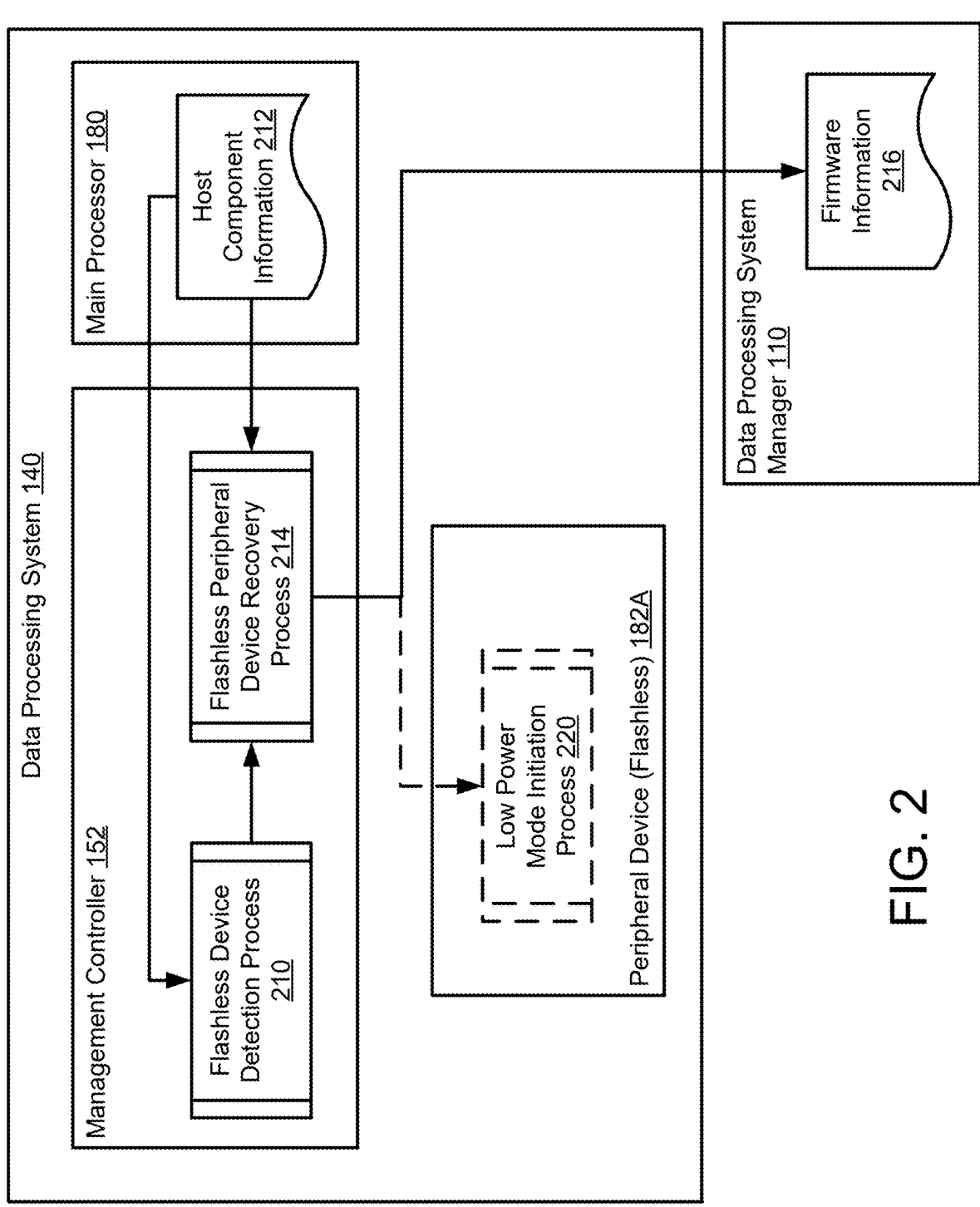
FIG. 2 shows a data flow diagram in accordance with one or more embodiments.

To further clarify embodiments disclosed herein, a data flow diagram in accordance with one or more embodiments disclosed herein is shown in FIG. 2. In these diagrams, flows of data and processing of data are illustrated using different sets of shapes. A first set of shapes (e.g., 212, 216, etc.) is used to represent data structures (e.g., files, data packets, or the like), a second set of shapes (e.g., 210, 214, 220, etc.) is used to represent processes performed using and/or that generate data, and a third set of shapes (e.g., 152, 180, 110, 182A, etc.) is used to represent the components (e.g., the devices, hardware and/or software components, or the like discussed above in reference to FIGS. 1A-1D) that perform the processes shown using the second set of shapes.

Although the data flow diagram of FIG. 2 is described only using peripheral device 182A of peripheral devices 182A-182N shown in FIG. 1C, one of ordinary skill in the art would appreciate that the process shown in the data flow diagram of FIG. 2 may be applied to any and all of the peripheral devices 182A-182N.

Turning now to FIG. 2, initially assume that peripheral device 182A has now become flashless. For the purposes of the data flow diagram of FIG. 2, peripheral device 182A will also now be referred to as peripheral device (flashless) 182A.

The management controller 152 may be configured to perform a flashless device detection process 210. The flashless device detection process 210 may be done at any time including: (i) at a startup (e.g., when the data processing system 140 is booting up after being powered on (or after a reset/restart of the data processing system 140)); (ii) after a system host (e.g., the host operating system (OS) hosting by the main processor 180) has completed booting up; or any other stage between the powering-on (or resetting/restarting) of the data processing system to when the OS is ready for use by a user of the data processing system 140. Said another way, the management controller 152 may perform several checks (as part of flashless device detection process) during different stages of a boot up (also referred to as a "startup") of the data processing system 140.

The management controller 152 may also be caused to repeat the flashless device detection process 210 at any interval (e.g., a predetermined interval) set by a user and/or administrator of the data processing system 140 or of the data processing system manager 110.

As part of flashless device detection process 210, the management controller 152 may check, during the various stages of the data processing system 140 boot up, for one or more indications that peripheral device (flashless) 182A is (potentially) physically connected to the data processing system 140 while being unresponsive to instructions and commands issued by the management controller 152.

For example, as one (e.g., a first) check, the management controller 152 may initiate one or more i2c discovery processes (e.g., MCTP Endpoint discovery processes) using the sideband channels 174 to try find (e.g., discover) peripheral device (flashless) 182A. Because peripheral device 182A is flashless, such i2c discovery processes performed by the management controller 152 will usually fail to identify (e.g., discover) peripheral device (flashless) 182A.

As another (e.g., a second) check, the management controller 152 may receive host component information 212 from the main processor 180 (e.g., from the BIOS hosted on the main processor 180). The host component information 212 may include a list (e.g., inventory) of all of the software and hardware components making up (e.g., being hosted by) the data processing system 140.

The host component information 212 may also include any relevant information (e.g., pieces of information) associated with these software and hardware components including, but not limited to: (i) version information; (ii) name or other unique identification (ID); (iii) version, part, and/or model number; (iv) physical and/or virtual port connection information; or the like. Any type of information that directly describe details of these software and hardware components themselves and that describe how these software and hardware components are used and/or configured in the data processing system 140 may be included in host component information 212 without departing from the scope of embodiments disclosed herein.

Additionally, the management controller may also maintain its own copy of the host component information 212 (e.g., through its own discovery of the hardware and software components and/or through the information being provided from the data processing system manager 110).

Turning back to the second check, as part of the second check, the management controller 152 may find information within the host component information 212 such as a field replaceable unit (FRU) or connection interface information (e.g., a PCIe connection information, or the like) of peripheral device (flashless) 182A that indicates to the management controller 152 that peripheral device (flashless) 182A could be physically connected to the data processing system 140. For example, the PCIe connection information reveals that there is a device connected to a specific part of the PCIe bus (e.g., PCIe Bus 184 of FIG. 1C) even though no peripheral devices were discovered via the first check.

Similarly, the field replaceable unit (FRU) would indicate that the data processing system 140 was fitted with peripheral device 182A when the data processing system was deployed (e.g., to deployment 101).

As a follow up to the second check, the management controller 152 may again perform one or more i2c discovery processes (e.g., to check an i2c inventory or the like) to attempt to discover peripheral device (flashless) 182A that (by way of the FRU and/or PCIe connection information) should theoretically (to the management controller 152) be physically connected to the data processing system. However, because the peripheral device 182A is flashless, such i2c discovery processes performed again by the management controller 152 will again fail to identify (e.g., discover) peripheral device (flashless) 182A.

As another (e.g., a third) check, the management controller 152 may wait until the host system (e.g., host OS) can completed booting up. Once the host system has completed booting up, the management controller 152 may retrieve information regarding all of the drivers (e.g., host drivers) loaded into the host system. If a host driver is found for peripheral device (flashless) 182A, then this again indicates to the management controller 152 that the peripheral device (flashless) 182A is (or is most likely) physically connected to the data processing system 140.

As part of the third check and after finding the host driver, the management controller 152 may yet again attempt another i2c discovery process to try find (e.g., discover) the peripheral device (flashless) 182A. Should the peripheral device (flashless) 182A remain flashless, this attempt by the management controller 152 will again fail to discover the peripheral device (flashless) 182A.

Although the various checks above are described as first, second, and third checks (e.g., determinations), these numeric terms do not reflect the actual numeric order in which these checks are performed. These numeric terms also do not reflect that all three checks have to be performed. In particular, any number of these checks may be performed in any order without departing from the scope of embodiments disclosed herein as long as the management controller 152 is able to reach a conclusive determination that something undiscoverable (e.g., peripheral device (flashless) 182A) is (or is likely) to be physically connected to the data processing system 140.

The rules and requirements regarding what constitute a conclusive determination may be set by a user and/or administrator of the data processing system 140. For example, a first user may require at least two checks (e.g., the first check in combination with either the second or the third check, or the like) be performed for results to be deemed conclusive. As yet another example, a different user may only require results from one check, but the check has to be at least the second or the third check.

Turning back to FIG. 2, if any flashless peripheral devices are marked (e.g., tagged) by management controller 152 (e.g., in this example assume again that there is peripheral device (flashless) 182A and that this peripheral device has been marked (e.g., tagged) peripheral device (flashless) 182A as flashless), management controller 152 may initiate flashless peripheral device recovery process 214.

In embodiments, as part of flashless peripheral device recovery process 214, the management controller 152 may first wait for the data processing system 140 complete its boot up (e.g., should the data processing system 140 previously be in a booting up state) and complete the data processing system's 140 driver initialization process. Once the data processing system 140 is in a completed boot up state (e.g., the OS has completed booting up and all of the host drivers loaded onto the OS has been initialized), the management controller 152 may (as part of flashless peripheral device recovery process 214) check specific card slot driver information for each (possible) physical connection detected by the management controller 152 during the flashless device detection process 210.

For example, if the management controller 152 detected that there is something connection to portion (e.g., slot) A of the PCIe Bus 184, then the management controller 152 may check (as part of flashless peripheral device recovery process) corresponding the OS to see whether any host drivers are associated with slot A of the PCIe Bus 184.

The host driver initialization information and the specific card slot driver information may again be provided to (or retrieved by) the management controller 152 (e.g., by or from the main processor 180) in the form of host component information 212.

If the management controller 152 determines that no host drivers are associated with any of the physical connections (e.g., physical card slot) identified during the flashless device detection process 210 (or that there is a host driver but the host driver is wrong or corrupted based on cross-checking the host driver information with information such as the FRU from the host component information 212), then the management controller 152 may determine that whatever device (e.g., whatever peripheral device) connected at any one of these physical connections is missing experiencing one or more of the above-discussed situations that would render this peripheral device as a flashless peripheral device.

Further as part of flashless peripheral device recovery process 214, after identifying that a host driver is entirely missing (or that there are any issues with the host driver) at any one of the detected physical connections (e.g., detected in-use card slot, or the like), the management controller 152 may generate firmware information 216 (e.g., as a notification, or the like). Any other types of driver-related issues (also referred to herein as "driver issues") may be identified by the management controller 152 without departing from the scope of embodiments disclosed herein.

As part of generating firmware information 216, the management controller 152 may retrieve driver information for peripheral device (flashless) 182A using, for example: the FRU of the peripheral device (flashless) 182A, or any other information included in the host component information 212 that would allow the management controller 152 to identify the specific model (and/or part number) and version of peripheral device (flashless) 182A. The driver information may include a link to the drivers (and/or firmware) required to recover the peripheral device (flashless) 182A to a non-flashless state.

The driver information (including the link) and other information associated with peripheral device (flashless) 182A (including the model/part number, FRU, FRU original equipment manufacturer (OEM) data, or the like) may be included in the firmware information 216. The firmware information may be communicated to a user of the data processing system 140 as a life cycle log (e.g., a data log) or the like. The life cycle log (or the like) (or the entire firmware information 216) may be displayed to the user (e.g., as a notification) via a display of the data processing system manager 110 or a display of the data processing system 140 itself. This advantageously notifies the user of the need to retrieve the necessary drivers (and/or firmware) for the peripheral device (flashless) 182A to recover the peripheral device (flashless) 182A to a non-flashless state.

Alternatively or in addition to the above, after or in parallel with providing the firmware information 216 to the user, the management controller 152 may automatically retrieve (e.g., download) the necessary drivers (and/or firmware) from the link(s) included in the firmware information 216 from the network (e.g., from other devices connected to communication system 120) (if these drivers and/or firmware are available publicly). Upon retrieval of these drivers (and/or firmware), the management controller 152 may provide the retrieved drivers (and/or firmware) to main processor 180 for main processor 180 to install these drivers (and/or firmware) in order to recover the peripheral device (flashless) 182A to a non-flashless state.

In addition to generating firmware information 216, the management controller 152 may further generate (as part of flashless peripheral device recovery process 214) and/or update a peripheral device list hosted (e.g., managed) by the management controller 152 to indicate that peripheral device 182A has a degraded health status (e.g., is a flashless peripheral device 182A). The peripheral device list may include information (e.g., part and/or model number, FRU, connection information, or the like) regarding all peripheral devices (e.g., 182A-182N of FIG. 1C) connected to the data processing system 140. If such peripheral device list is available, such peripheral device list may be used in conjunction with host component information 212 used during the flashless device detection process 210 and the flashless peripheral device recovery process 214.

Furthermore, when the management controller 152 determines that a peripheral device has failed (e.g., become flashless, crashed, needs to be replaced, is not booting up properly, or the like), the management controller 152 may (optionally) cause (e.g., provide commands to the peripheral device via the identified physical connections) such peripheral devices to enter a low power mode. In particular, the management controller 152 may cause any failed peripheral devices to perform low power mode initiation process 220 to enter the low power mode. The low power mode may be automatically stopped, by the management controller 152 or by the respective peripheral device itself, after the peripheral device has been recovered (e.g., recovered from the flashless state, or the like).

For example, for peripheral devices that have become flashless (e.g., have firmware related issues), as long as the management controller 152 is able to identify the physical location (e.g., physical ports, physical connections, or the like) of the flashless peripheral device (e.g., using the PCIe connection information, card slot driver information, or the like), the management controller 152 may still utilize the sideband channels 174 connecting the management controller 152 to the flashless peripheral device to hardcode the hardware (e.g., a system on a chip (SoC), or the like) of the flashless peripheral device to enter the low power mode. Thus, even though the software portion (e.g., firmware) of the flashless peripheral devices is not operational, the flashless peripheral devices may still advantageously be controlled (e.g., via the hardcoding of hardware components) by the management controller 152 to enter the low power mode in order to advantageously conserve power usage by the data processing system 140 to which these flashless peripheral devices are connected.

Said another way, the management controller 152 supports generic power commands (e.g., Intelligent Platform Management Interface (IPMI) commands or the like) that can be applied to the physical slots (e.g., physical connection/communication interface) to which the peripheral devices are connected. These generic power commands commands might not rely on the need for device-specific firmware to be available on the peripheral devices but may regardless toggle a power state of the peripheral devices.

After causing a peripheral device to enter the low power mode, the management controller 152 may generate (or update) the peripheral device list hosted by the management controller 152 to indicate that that peripheral device (caused to enter the low power mode) has the degraded health status.

Any of the processes illustrated using the second set of shapes (shown in FIG. 2) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

As discussed above, the components of FIGS. 1A-2 may perform various methods for managing a boot up process of a data processing system. FIG. 3 illustrates an example method that may be performed by the components of FIGS. 1A-2. For example, any of the data processing systems 102A-102N, and/or the data processing system manager 110 shown in FIG. 1A may perform all or a portion of the method of FIG. 3. In the diagram discussed below and shown in FIG. 3, any of the operations may be repeated, performed in different orders, and/or performed in parallel with or in a partially overlapping in time manner with other operations.

Figure 3:
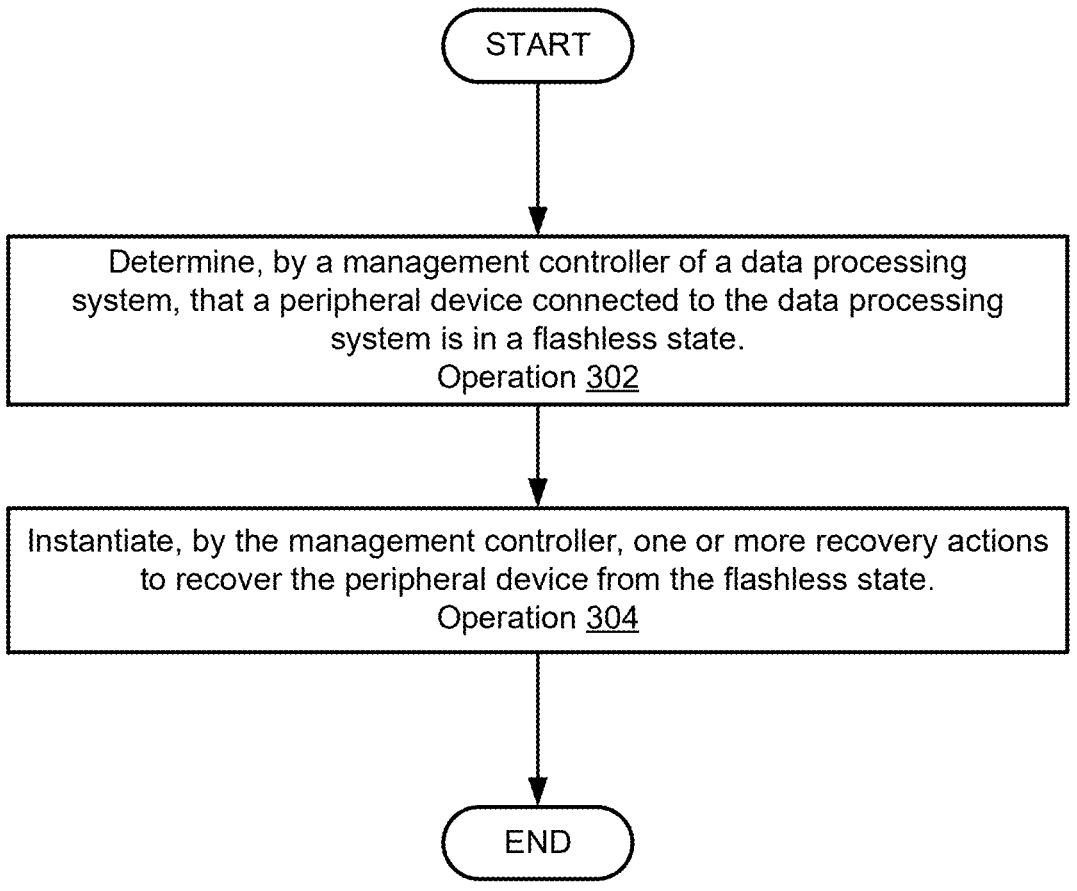
FIG. 3 shows a flowchart in accordance with one or more embodiments.

Starting with FIG. 3, in Operation 302 and as discussed above in reference to FIG. 2, a management controller of a data processing system may determine that a peripheral device connected to the data processing system is in a flashless state (e.g., has become a flashless peripheral device).

In Operation 304, and as discussed above in reference to FIG. 2, the management controller may instantiate (e.g., start) one or more recovery actions (e.g., in the form of one or more actions performed as part of flashless peripheral device recovery process 214 discussed in FIG. 2) to recover the peripheral device from the flashless state.

The method of FIG. 3 may end Operation 304.

Any of the components illustrated in FIGS. 1A-3 may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

making a first determination, by a management controller of the data processing system, that a peripheral device connected to the data processing system is in a flashless state, wherein the management controller is a microcontroller installed within the data processing system that operates independently of a central processing unit (CPU) of the data processing system, the management controller manages the peripheral device, and the management controller makes the first determination by at least:

identifying one or more pieces of information indicating that the peripheral device is physically connected to the data processing system, the peripheral device is a data processing unit (DPU), and the one or more pieces of information indicating that the peripheral device is physically connected to the data processing system comprise:

a field replacement unit (FRU) of the peripheral device, and communication interface information comprising a physical interface of the data processing system to which the peripheral device is connected;

making a second determination, that the management controller is unable to discover the peripheral device despite the peripheral device being physically connected to the data processing system; and tagging the peripheral device as being in the flashless state based on the second determination; and instantiate, by the management controller and in response to the first determination, one or more recovery actions to recover the peripheral device from the flashless state.

2. The method of claim 1, wherein the one or more pieces of information indicating that the peripheral device is physically connected to the data processing system further comprise:

information indicating that the data processing system comprises one or more drivers associated with the peripheral device.

3. The method of claim 2, wherein the management controller uses an inter-integrated circuit (i2c) discovery mechanism to discover the peripheral device during and after a startup of the data processing system, and the communication interface information is identified from a basic input/output system (BIOS) inventory of the data processing system during the startup of the data processing system.

4. The method of claim 1, wherein the one or more recovery actions comprise:

waiting for a host of the data processing system to be booted up, the host being an operating system (OS) of the data processing system;

once the host is booted up, making a second determination that the host comprises a driver issue with regard to the peripheral device in the flashless state; and generating, in response to the second determination, a notification to a user of the data processing system indicating the driver issue.

5. The method of claim 4, wherein the driver issue comprises the host missing a driver for the peripheral device in the flashless state or the host comprising an incorrect one for the driver of the peripheral device in the flashless state.

6. The method of claim 4, wherein generating the notification further comprises:

retrieving driver information and device information of the peripheral device in the flashless state using field replacement unit (FRU) original equipment manufacturer (OEM) data from the peripheral device in the flashless state; and generating, as part of the notification:

a link, using the driver information, for retrieving a driver required for the peripheral device in the flashless state to recover from the flashless state, and life cycle logs comprising the device information.

7. The method of claim 4, wherein the one or more recovery actions comprise:

causing the peripheral device in the flashless state to enter a low power mode, the low power mode being automatically stopped by the peripheral device in the flashless state once the flashless state is resolved.

8. The method of claim 7, wherein the one or more recovery actions further comprise:

after causing the peripheral device in the flashless state to enter the low power mode, updating a peripheral device list hosted by the management controller to indicate that the peripheral device has a degraded health status.

9. A non-transitory machine-readable medium having instructions stored therein, which when executed by a processor, cause the processor to perform operations for managing peripheral devices of a data processing system, the operations comprising:

making a first determination, by a management controller of the data processing system, that a peripheral device connected to the data processing system is in a flashless state, wherein the management controller is a microcontroller installed within the data processing system that operates independently of a central processing unit (CPU) of the data processing system, the management controller manages the peripheral device, and the management controller makes the first determination by at least:

identifying one or more pieces of information indicating that the peripheral device is physically connected to the data processing system, the peripheral device is a data processing unit (DPU), and the one or more pieces of information indicating that the peripheral device is physically connected to the data processing system comprise:

a field replacement unit (FRU) of the peripheral device, and communication interface information comprising a physical interface of the data processing system to which the peripheral device is connected;

making a second determination, that the management controller is unable to discover the peripheral device despite the peripheral device being physically connected to the data processing system; and tagging the peripheral device as being in the flashless state based on the second determination; and instantiate, by the management controller and in response to the first determination, one or more recovery actions to recover the peripheral device from the flashless state.

10. The non-transitory machine-readable medium of claim 9, wherein the one or more pieces of information indicating that the peripheral device is physically connected to the data processing system further comprise:

information indicating that the data processing system comprises one or more drivers associated with the peripheral device.

11. The non-transitory machine-readable medium of claim 10, wherein the management controller uses an inter-integrated circuit (i2c) discovery mechanism to discover the peripheral device during and after a startup of the data processing system, and the communication interface information is identified from a basic input/output system (BIOS) inventory of the data processing system during the startup of the data processing system.

12. The non-transitory machine-readable medium of claim 9, wherein the one or more recovery actions comprise:

waiting for a host of the data processing system to be booted up, the host being an operating system (OS) of the data processing system;

once the host is booted up, making a second determination that the host comprises a driver issue with regard to the peripheral device in the flashless state; and generating, in response to the second determination, a notification to a user of the data processing system indicating the driver issue.

13. The non-transitory machine-readable medium of claim 12, wherein the driver issue comprises the data processing system missing a driver for the peripheral device in the flashless state or the host comprising an incorrect one for the driver of the peripheral device in the flashless state.

14. The non-transitory machine-readable medium of claim 12, wherein the one or more recovery actions comprise:

causing the peripheral device in the flashless state to enter a low power mode, the low power mode being automatically stopped by the peripheral device in the flashless state once the flashless state is resolved.

15. A management controller of a data processing system, the management controller comprising:

a processor; and a memory coupled to the processor, the memory storing instructions that, when executed by the processor, cause the management controller to perform operations for managing peripheral devices of the data processing system, the operations comprising:

making a first determination, by the management controller, that a peripheral device connected to the data processing system is in a flashless state, wherein the management controller is a microcontroller installed within the data processing system that operates independently of a central processing unit (CPU) of the data processing system, the management controller manages the peripheral device, and the management controller makes the first determination by at least:

identifying one or more pieces of information indicating that the peripheral device is physically connected to the data processing system, the peripheral device is a data processing unit (DPU), and the one or more pieces of information indicating that the peripheral device is physically connected to the data processing system comprise:

a field replacement unit (FRU) of the peripheral device, and communication interface information comprising a physical interface of the data processing system to which the peripheral device is connected;

making a second determination, that the management controller is unable to discover the peripheral device despite the peripheral device being physically connected to the data processing system; and tagging the peripheral device as being in the flashless state based on the second determination; and instantiate, by the management controller and in response to the first determination, one or more recovery actions to recover the peripheral device from the flashless state.

16. The management controller of claim 15, wherein the one or more pieces of information indicating that the peripheral device is physically connected to the data processing system further comprise:

information indicating that the data processing system comprises one or more drivers associated with the peripheral device.

17. The management controller of claim 16, wherein the management controller uses an inter-integrated circuit (i2c) discovery mechanism to discover the peripheral device during and after a startup of the data processing system, and the communication interface information is identified from a basic input/output system (BIOS) inventory of the data processing system during the startup of the data processing system.

18. The management controller of claim 15, wherein the one or more recovery actions comprise:

waiting for a host of the data processing system to be booted up, the host being an operating system (OS) of the data processing system;

once the host is booted up, making a second determination that the host comprises a driver issue with regard to the peripheral device in the flashless state; and generating, in response to the second determination, a notification to a user of the data processing system indicating the driver issue.

19. The management controller of claim 18, wherein the driver issue comprises the data processing system missing a driver for the peripheral device in the flashless state or the host comprising an incorrect one for the driver of the peripheral device in the flashless state.

20. The management controller of claim 18, wherein the one or more recovery actions comprise:

causing the peripheral device in the flashless state to enter a low power mode, the low power mode being automatically stopped by the peripheral device in the flashless state once the flashless state is resolved.

* * * * *